United States Patent [19]

Wiley et al.

[11] 3,855,889

[45] Dec. 24, 1974

[54] SLICER

[75] Inventors: Ron Wiley, Los Angeles; Harvey R. Searing, Glendale, both of Calif.

[73] Assignee: Leo's Quality Foods, Los Angeles, Calif.

[22] Filed: Dec. 4, 1972

[21] Appl. No.: 312,109

[52] U.S. Cl.................. 83/490, 83/329, 83/355, 83/23
[51] Int. Cl.................. B23d 25/02, B26d 4/04
[58] Field of Search............ 83/329, 355, 356, 490, 83/215

[56] References Cited
UNITED STATES PATENTS

| | | | |
|---|---|---|---|
| 2,870,810 | 1/1959 | Folk................................. | 83/356 X |
| 3,353,430 | 11/1967 | Brackman et al.................. | 83/355 X |
| 3,650,936 | 3/1972 | Towle............................... | 83/490 X |

FOREIGN PATENTS OR APPLICATIONS

| | | | |
|---|---|---|---|
| 766,091 | 8/1967 | Canada................................. | 83/329 |

*Primary Examiner*—Willie G. Abercrombie
*Attorney, Agent, or Firm*—Spensley, Horn & Lubitz

[57] ABSTRACT

An improved slicer having a separate, controllable and relatively high speed knife, a delivery conveyor belt readily controllable in position in respect to the slicing apparatus to receive the sliced product in the desired manner, and means for automatically causing the folding of each slice to create a new and novel appearance in the subsequently packaged product. The means for automatically folding each slice of the sliced product is comprised of a member appropriately supported in the trajectory of each slice as it falls from the remaining unsliced product toward the conveyor belt so as to interrupt the trajectory of that part of the slice to result in the folding of the slice upon impingement of the conveyor.

3 Claims, 8 Drawing Figures

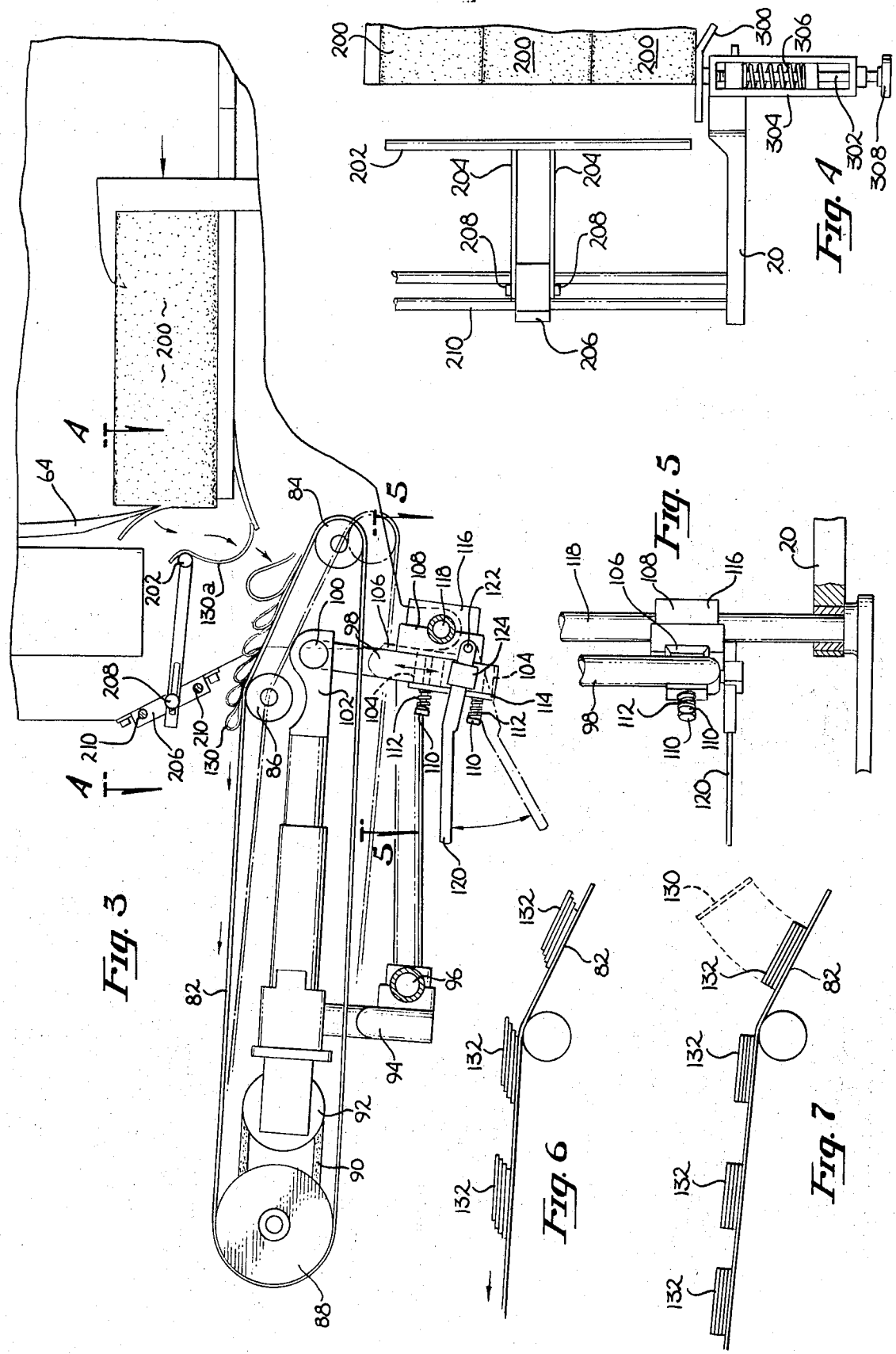

SLICER

BACKGROUND OF THE INVENTION

1. Field of the Invention.

This invention relates to the field of slicing equipment, and particularly to slicing equipment for slicing food products prior to packaging.

2. Prior Art.

Different types of slicing machines for slicing food products are well known in the prior art. These machines are typically in every day use in slicing cooked meats, cheeses, etc. prior to the packaging thereof, typically in some form of clear plastic vacuum packaging. In these applications, the food product to be sliced is typically delivered to the slicing machine in some form of loaf, roll, or similar geometric shape, which may be loaded into the slicing machine for automatic slicing thereby. Typically, the slices are received on some form of conveyor belt for removal from the slicing machine for packaging on other equipment.

Of particular importance to the specific embodiment of this invention disclosed herein is the slicing machine manufactured by U.S. Slicing Machine Company, Inc., La Porte, Indiana, as their heavy duty slicing machine. This machine is complete with an advance system to automatically feed the product into the machine for slicing, and a delivery conveyor belt, controlled in cooperation with the automatic feed of the food products into the knife so as to deliver the slices of food to a subsequent station. The machine is characterized by a slightly disc shaped knife, rotationally mounted above a knife axis radially displaced from a central drive axis. As a result of the coupling between these two axes through a drive system, the knife is caused to rotate about its own axis as well as to revolve in a fixed orbit. Thus by advancing the food items to be sliced at the proper position of the circular orbit, the knife may be caused to progress through food items at a subsequent position in the circular orbit so as to cut a new slice.

The machine is further characterized by a timing and control system which allows the cooperative operation of the unsliced food advanced system and the conveyor system for the sliced food. Accordingly, for each rotation of the knife assembly providing one slicing motion, the food to be sliced may be advanced for a new slice, or the conveyor may be advanced by control of the advance position of the sliced food. In another mode, the unsliced food advance system and the conveyor may operate simultaneously, which will cause a high degree of overlap of the individual slices on the conveyor, referred to herein as shingling.

In certain applications, shingling may be satisfactory or even desired. However, a large number of foods, such as processed meats, cheeses and the like are packaged as uniform stacks of sliced food, to be put in some form of vacuum pack. To obtain this result with the previously described machine, the machine is set so that a predetermined number of slices are cut and are allowed to fall on a common position on the conveyor. Then as the machine continues to operate with the slicing motion, the unsliced food advance is stopped for a predetermined number of slicing cycles, while the conveyor is advanced to a new position to receive the next group of slices. Thereafter, slicing resumes with the resumption of the advance of the unsliced food for the predetermined number of slices. To obtain a stack of food which does not have significant shingling, the end of the conveyor belt in the slicing area is vertically adjustable by loosening certain bolts and forcing the conveyor to the desired position.

The above described method of slicing to obtain uniform stacks of sliced food products on the delivery conveyor works well for the slicing of foods which in the loaf or roll are relatively firm and rigid. By way of example, cooked and smoked loaves of roast beef are relatively rigid and may be satisfactorily sliced on this equipment. However, certain food products such as ham in the loaf form are not as rigid. For these foods the advance of the end of the loaf being sliced is not always simultaneous with the mechanism advancing the loaf. Consequently, in the operating cycle heretofore described, the slice thickness may vary or be tapered. Further, though the progression of the loaf should repetitively stop so as to allow progression of the delivery conveyor, a loaf of ham, etc. will tend to creep toward the knife so that the normally inactive cutting strokes tend to shave the loaf, creating slivers and particles of meat which detracts from the visual appearance of the stacked slices. Thus, this residue, if left on the stacks, detracts from the appearance of the product, which is normally packaged in transparent packages. If it is removed, it represents waste or at least a product which must be recycled, and further characteristically must be removed by hand.

Also, while the machine previously identified has the adjustments necessary to result in the automatic stacking of the sliced meat with a minimum of shingling, the adjustment mechanism is designed primarily as an initial set-up adjustment and is not adapted for easy minor readjustment as may be desirable based upon the characteristics of the food products then being sliced. Further, only conventional forms of sliced food products may be automatically created, specifically, either shingled or stacked.

Thus, there is a need for improvements in slicing equipment for providing further variations in the form of sliced foods, to eliminate shaving and tapered slieces, particularly encountered with the softer food products, and to operate in a manner allowing the easy separation of given quantities of food products for individual packaging.

BRIEF SUMMARY OF THE INVENTION

An improved slicer having a separately controllable and relatively high speed knife, a delivery conveyor belt readily controllable in position in respect to the slicing apparatus to receive the sliced product in the desired manner, and a means for automatically causing the folding of each slice to create a new and novel appearance in the subsequently sliced product. In accordance with the invention, a separate variable speed drive system is used to control the high speed knife independent of the reciprocal motion thereof. A continuously repetitive cutting cycle is used, with the desired stacking of the slices obtained by the accurate positioning of the delivery conveyor and by the proper sequencing of the machine. While machine speeds are substantially reduced, production quantities are maintained by simultaneous multiple slicing. A means properly disposable with respect to the falling slices may be used to fold each slice, and together with the sequencing of the conveyor to create an unusual visual appearance in the resulting packaged meat.

BRIEF DESCRIPTION OF THE DRAWINGS

FIG. 2a is a cross-section taken along lines 2a—2a of FIG. 1.

FIG. 2b is a partial cross-sectional view of the prior art machine corresponding to a portion of the cross-sectional view of one aspect of the present invention shown in FIG. 2a.

FIG. 3 is a side view, in partial cross-section, of the conveyor, knife and other aspects of the present invention machine.

FIG. 4 is a view taken along line 4—4 of FIG. 3.

FIG. 5 is a view taken along line 5—5 of FIG. 3.

FIG. 6 is a schematic side view of the conveyor illustrating the shingling effect resulting from the impingement of slices on the conveyor in a non-orthogonal direction.

FIG. 7 is a schematic view similar to FIG. 6 illustrating the accurate stacking of the slices resulting from the impingement of each slice from a direction perpendicular to the conveyor.

DETAILED DESCRIPTION OF THE INVENTION

Figure 1:
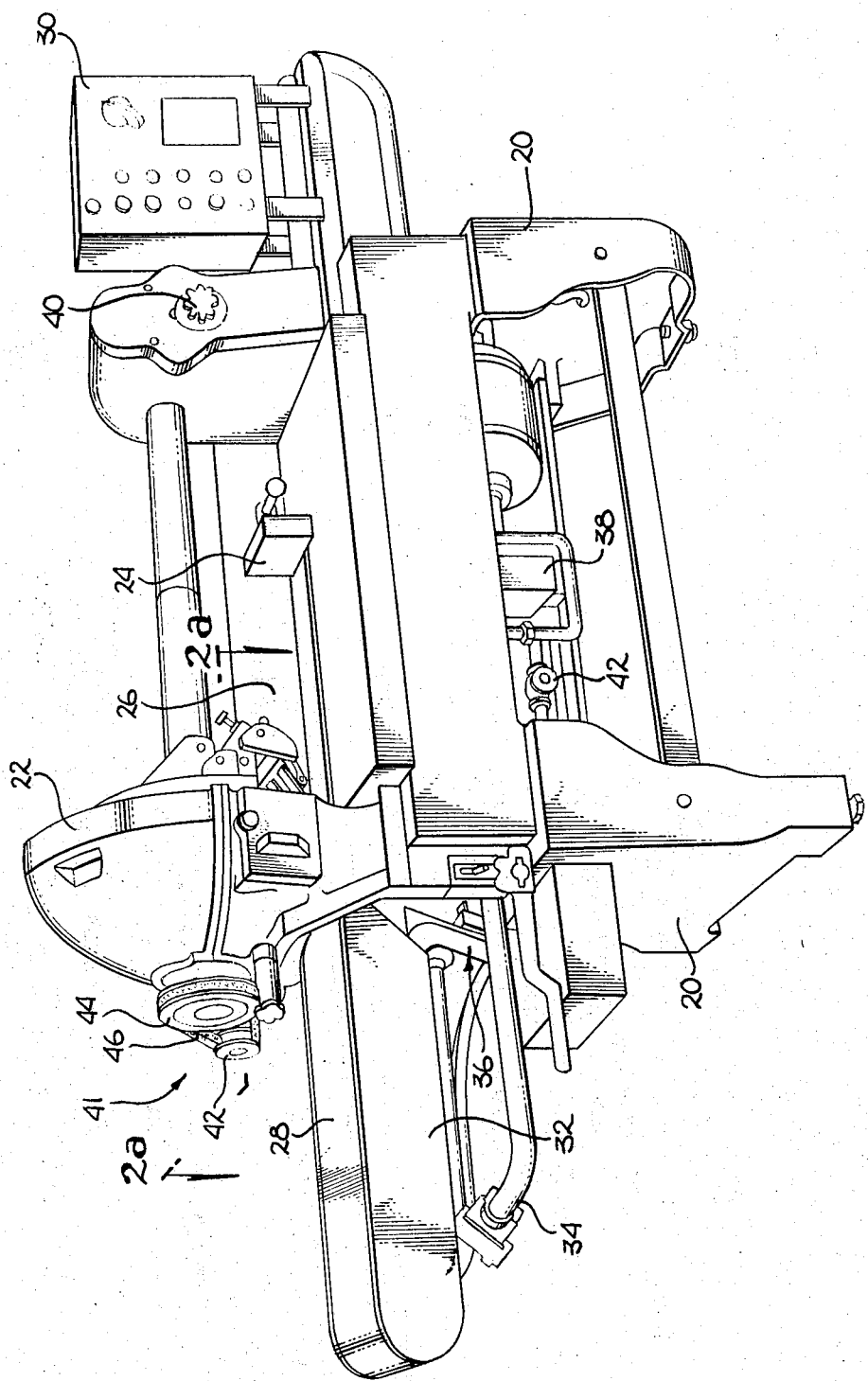
FIG. 1 is a prospective view of the prior art slicing machine incorporating certain aspects of the present invention and with the guard for the independent knife drive removed therefrom to show the details of the belt drive system.

First referring to FIG. 1, a prospective view of a commercially available slicing machine may be seen. This machine is manufactured by U.S. Slicing Machine Co., Inc., La Porte, Indiana, and sold as their heavy duty slicing machine. Since the present invention improvements to this machine have been used in the slicing of prepared meats in the loaf form, and because slicing of some of these meat represents some of the problems hereinbefore mentioned, the machine and the operation of the improvements herein disclosed shall be described with respect to meat slicing on the above machine, it being understood that the improvements are not so limited in use and may be generally used for a wide variety of food products and with respect to slicing machines of other designs.

The functional components of the machine are supported on a frame 20. A cutting knife is disposed within housing 22, with a slide assembly 24 disposed so as to progressively slice a loaf of meat located within the area indicated in numeral 26 into the vicinity of the knife within the housing 22. The meat, after being sliced, falls on a conveyor belt 28 and is carried to the left of the machine for further processing. The progression of slide assembly 24 as well as that of conveyor 28 is controlled by a control unit 30, which may be set to coordinate the progression of these two elements in the desired manner to generally achieve the slicing and stacking required. The conveyor 28 is on a conveyor frame assembly 32 rotationally supported on the outer end by arm 34, and adjustably supported on the other right end by a mechanism generally indicated by the numeral 36. Various other features of this machine include a hydraulic system 38 for advancing the slide assembly 24, etc., and a slice thickness control 40 for controlling the advance of the slide assembly 24. The advance of the conveyor belt 28 is also hydraulically controlled by hydraulic system 38, with the amount of advance of conveyor belt 28 being controlled by a flow control valve 42. A solenoid operated valve is disposed in the hydraulic line used to control the advance of slide assembly 24, and a second such valve is located along a line driving conveyor 28. These two valves are controlled by the control system 38, which in turn is synchronized to the operation of the knife, so as to be capable of coordinating the motion of the slide assembly 24 and conveyor 28 to provide stacks of sliced meat. This feature is referred to as the electronic counter and grouper.

One aspect of the present invention may be seen in the machine of FIG. 1. Thus, a drive motor in region 41, having a pulley 42 thereon coupled to a second pulley 44 through a belt drive 46, is provided. This provides one of the basic drives for the knife within housing 22, the details of which may be more specifically seen in FIG. 2a. This figure is a cross section taken along lines 2a-2a of FIG. 1. The pulley 44 drives a shaft 48 supported on ball bearings 50. The shaft 48 has a sprocket assembly 52 thereon driving a sprocket assembly 54 through a chain drive system 56. The sprocket assembly 54 is mounted on a shaft 58 supported by bearings 60 for rotation about an axis parallel to but radially offset from the axis of shaft 48. At one end of the shaft 62 is a means for holding a circular disc shaped knife 64 thereto by means of bolts 66. The outer races of bearings 60 supporting shaft 58 are mounted in a rotatable crank assembly 68, which in turn is rotably supported along an axis coincident with the axis of shaft 48 by bearings 70 mounted to the frame of the slicing machine. The outer surface 72 of the crank assembly is provided with grooves to receive and be driven by belt 74. Thus, by driving the V-belt 46, the knife blade 64 may be caused to rotate about its axis at a controllable speed. Similarly, driving of the belt 74 by a motor of conventional design will cause the entire knife to sweep through a circular path or orbit which together with the rotation of the knife may be used to cause the slicing of an article appropriately progressing in relation to the motion of the knife.

Figures 2A, 2B:
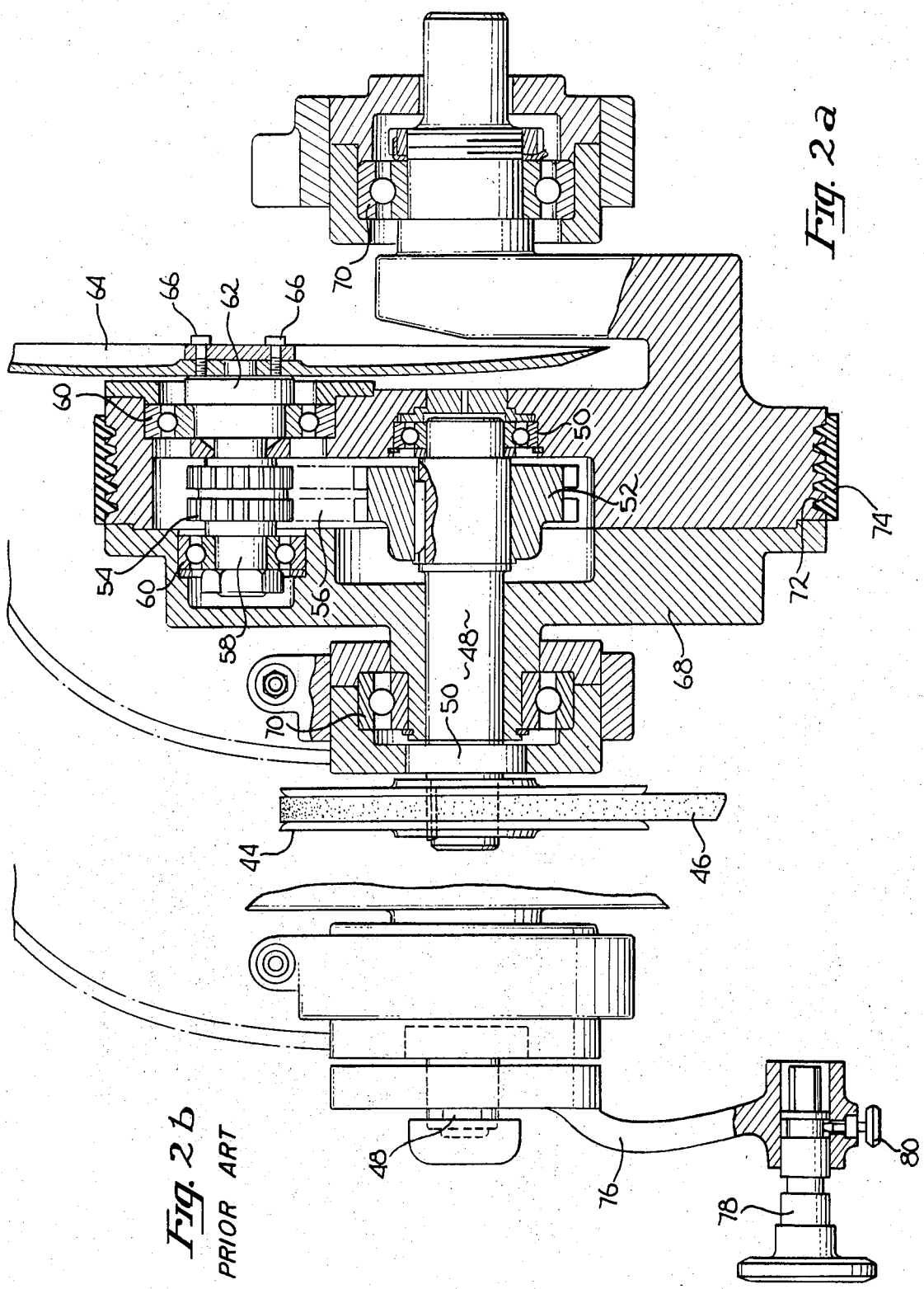

The above is to be compared with the prior art machine, a portion of which is shown in FIG. 2b. In that machine, instead of having the pulley 44 of FIG. 2a and a drive therefore, the shaft 48 is fastened to a crank assembly 76, having a manually controllable pin assembly 78 for effectively rotatably locking the shaft 48 to the frame of the slicing machine. Consequently, while rotation of the crank assembly 68 of FIG. 2a of belt 74 would cause some rotation of the knife blade 64, in the prior art machine speed of the knife in comparison with the advance of the knife into the food item to be sliced was low, resulting in the cutting action closer to chopping rather than to slicing. (In the prior art machine, a pin assembly 80 could be used to lock the pin 78 in the withdrawn position so that the knife 64 could be manually rotated by the crank 76 to sharpen the blade, though simultaneous drive of the shaft 48 and crank assembly 68 was not envisioned or provided for in the prior art.)

The means for independently determining the knife speed in accordance with one aspect of the present invention has a number of advantages. The knife speed may be increased over that of the prior art machines so that better slicing, as opposed to a chopping action, is achieved. This reduces the force exerted on the food item to be sliced, thereby resulting in less deflection of the item as the knife progresses therethrough, thereby providing a smoother cut on some items and yielding a more uniform slice. Also, because of the lower pressures on the food item to be sliced, it has been found that in the case of most of the cut meat, as many as three loads of cooked meat may be sliced by placing the three loaves in side by side relationship in the slicing machine. Without this increase in speed, the cutting pressures cause excessive deflection of the first loaf supporting the other two, so that unacceptable non-uniform slices and an irregular slicing action was achieved.

Now referring to FIGS. 3 through 7, other aspects of the present invention may be seen. FIG. 3 is a partial cross-section taken along lines 3—3 of FIG. 1, showing the details and general arrangement of the delivery conveyor with respect to knife blade 64 and other aspects of the present invention. The conveyor is comprised of a continuous conveyor belt 82 supported in tension by small rollers 84 and 86 and driven by the large roller 88 through a belt 90 and drive means 92, which in this particular instance is a hydraulic drive means. The assembly supporting the various rollers and drive means is rotatably supported through support 94 by shaft 96, so that the entire assembly may rotate about the axis of shaft 96 to raise or lower the right hand portion of the conveyor. The right hand portion of the conveyor is supported through an assembly comprising the slide member 98 joined by shaft 100 to member 102 on the conveyor assembly. The lower portion of member 98 is provided with a pair of slots 104 and further contain a slide 106, slideably engaging member 108. A pair of bolts 110 having compression springs 112 under the heads thereof maintain a constant pressure on plat 114, which in turn causes a desired frictional drag between the plate member 98 and member 108. Member 108 is bolted to member 116, with these last two members being rotatably supported by fixed shaft 118 supported by the frame 22 of the slicing machine. A lever 120 is pivotally affixed to member 108 by a bolt 122, and is also pivotally coupled to member 98 through an intermediate member 124, so that a fine control over the elevation of the right hand of the conveyor belt is provided through the lever 120, with the rear position being readily adjustable without tools and without interrupting the operation of the machine, as minor adjustments are indicated desirable. This is to be compared with the prior art machine, wherein member 98 was bolted directly to member 108, so that a wrench was required to loosen the bolts before adjustment and tighten them after adjustment, and adjustment itself could not be finally controlled. Thus any requirements for adjustment during operation required special attention of a mechanic. In accordance with this aspect of this present invention, the coil springs 112 provide adequate frictional drag of the various components so that no unintentional slippage is encountered, though adjustments may be readily made when and if required by anyone familiar with the operation of the machine and without tools.

Now referring to FIGS. 6 and 7, the advantage of providing an easily manipulated mechanical adjustment to the elevation of the delivery conveyor may be seen. If the elevation is not ideal, each slice of the food product, such as slice 130 shown in phantom in FIG. 6, will not fall upon the conveyor belt 82 generally perpendicular to the conveyor. Thus the stacks of the food products 132 will exhibit an offset or shingling effect, thereby not packaging as easily or attractively as they would without this effect. Thus in FIG. 7, the stacks of food product 132 are uniform and regular, a result achieved by the accurate vertical adjustment of the conveyor so that each of the slices 130 approaches the conveyor and/or stacks of food product thereon in a direction perpendicular to the surface of the conveyor so as to achieve the uniform stacking. Thus, non-uniformity in the stacking as may be observed by an operator may be readily corrected and controlled by lever 120 without stopping the machine or significantly interrupting production in any manner whatsoever. Individual stacks may be obtained as shown in FIG. 7, or in the alternative, individual stacks which somewhat overlap each other, but are readily separable for packaging, by advancing the conveyor after the desired number of slices have been accumulated in each stack.

Now referring to FIGS. 3 and 4, another aspect of the present invention may be seen. It is to be noted that the slices of food product 130 shown in FIG. 3 are folded in a closed U-shape, with each slice being somewhat advanced in position with respect to the successive slice. The advantage of this folding is that it allows a new and unique appearance in the packaged food products. Specifically, the folded slices when packaged in a clear, plastic package give an appearance approaching that of chipped beef, though meat so packaged may readily be separated and unfolded for use in sandwiches, hors d'oeuvres and the like. This effect, which has considerable customer appeal and provides a new dimension in packaging, is readily and automatically achieved in accordance with this aspect of the invention. Thus, accordingly, as the loaf of meat 200 is sliced by blade 64, the slices such as slice 130 fall so that the upper portion thereof engage a horizontal bar 202, appropriately disposed so as to interrupt the fall of that region portion of the slice. Accordingly, the middle and lower portion of the slice is free to proceed, resulting in the flipping in the top portion of the slice over and against the bottom portion to form a closed U-shape as it engages the conveyor belt 82. By advance of the conveyor belt 82 between each slice the progressive overlapping of the folded slices is achieved.

The bar 202 in the embodiment shown is welded to a pair of slotted side members 204, which are adjustably retained with respect to the mounting block 206 by thumb-screws 208. The mounting block 206 in turn is fastened to cross bars 210 which are supported at their extremes by a portion of the frame 20 of the slicing machine. Through thumb screws 208, the position of bar 202 may be readily adjusted to properly intercept the falling slice of meat so as to fold the slice in the desired manner. Thus the position of the bar and the position of the right end of the conveyor belt 82 with respect to the loaf 200 being sliced may be readily adjusted to cause the folding and the proper impingement of the folded slice onto the conveyor to be carried toward a packaging station thereby.

Having now described most of the structure of the present embodiment, certain advantages and new methods of operation of the equipment made, possible in part by the present invention apparatus will be described. In particular, the increased knife draw of knife 64 caused by the independent, controllable and higher speed drive greatly reduces the cutting pressure on the loaves being cut thereby. Consequently, it has been found that three loaves 200, as shown in FIG. 4, may be simultaneously sliced by placing the loaves in side by side relationship. Potentially, of course, this triples the amount of food product which may be sliced by the equipment. However, because of limitations in the rate at which a sliced food product may be removed from the conveyor, and because of certain other advantages, it has been found desirable to reduce the speed of the drive causing the cyclable cutting motion, that is the speed of the drive driving belt 74 (FIG. 2a), to approximately one-third of that previously used. With this reduction the sliced food product output remains approximately the same as prior to the addition of the apparatus of the present invention. However, as a result of this reduction, a significant advance of the converter belt 82 is possible between slicing motions. Consequently, the method of slicing in accordance with the present invention is comprised of the uninterrupted repetitive advance of the loaves being sliced, so that each slicing motion of the knife 64 slices the loaf as desired, with the slices being counted by counting the rotation of the crank assembly 68, with a rapid step advance of the conveyor belt 82 in the inactive portion of the slicing cycle after accumulating the preset number of slices. This is to be compared with the prior art method, wherein the loaf to be sliced will advance a predetermined number of times to obtain the desired number of slices, followed by a predetermined number of slicing cycles without the load advance, during which time the conveyor was advanced. Thus in the prior art method, shaving of the loaf would occur during these slicing cycles so as to create slivers and non-uniform slices as a natural result of the method, whereas in the present invention method, continuous slicing occurs so that each slice is substantially identical with every other slice. In addition, one of the advantages of the present invention slicing method is that the continual advance of the loaf appear to prevent the sticking of the loaf on the slide on which it rests, so that even for those softer food products, the entire loaf is more readily moved as a rigid object and does not have the tendency of distorting, compressing and the like, thereby further improving the uniformity of the slices obtained through the present invention apparatus.

The above method may be readily practiced on the prior art machine, on which the present invention has been practiced, by anyone familiar with the structure and operation of this machine. Specifically, a means is provided with the machine for counting the number of slices by counting the motion of the cutting head through an electronic counter and grouper and further has a provision for causing the advance of the conveyor during which time the loaf being sliced was not advanced. Thus, there is a signal available within this device for indicating a predetermined number of slices which may be used to cause the rapid advance of the conveyor between slices, while at the same time the number of spaces (slicing cycles during which the loaf being sliced is not advanced) is zero so that a continual slicing occurs as described with respect to the present invention method.

In order to assure three loaves, as shown in FIG. 4, are properly disposed in side by side relationship, it has been found desirable to provide a spring loaded guide comprised of a guided member 300 mounted on a shaft 302 in the frame assembly 304, and spring loaded by means of coil spring 306 into the inwardly extended position. Knob 308 is provided for manual retraction if required. For best operation, it has been found that the slide 300 should not rest against the side of the loaves when they are properly aligned, but should only be contacted by the loaves when misaligned to encourage them into proper disposition.

There has been described herein the present invention apparatus and method which provide for the more accurate slicing and stacking of food products with minimum waste and detriment to the visual appearance of the product, while maintaining slicing speed, increasing the ease of adjustability of the slicing machine, and reducing the mechanical speed of the cutting head of the slicing machine to prolong the life and for trouble free operation. Also described herein is the new apparatus for automatically achieving the folding and stacking of sliced food products such as meats so as to achieve a new and unique visual appearance in the packaged product. The invented apparatus and method may readily be provided and used in conjunction with commercially available slicing machines to achieve the new and useful results by one familiar with such equipment. thus, though one embodiment of present invention has been described in detail herein, it will be obvious to those skilled in the art the various changes in form and detail may be made therein without departing from the spirit and scope of the invention.

We claim:

1. In a slicing machine, an improved knife drive comprising a first structure supported on first and second main support bearings for rotation about a first longitudinal axis defined by said bearings, said first structure having a means between said first and second bearings for driving said first structure in rotation about said first longitudinal axis by a first drive motor;
  a central shaft supported by first and second central shaft bearings concentric to said first longitudinal axis for rotation about said first longitudinal axis, said first central shaft bearing being supported by said first structure between said first and second main support bearings;
  an offset shaft supported on first and second offset shaft bearings mounted on said first structure for rotation axis about a second axis substantially parallel to and radially offset from said first longitudinal axis, said offset shaft having a knife adjacent one end thereof at a longitudinal position between the longitudinal position of first and second main support bearings;
  means adjacent one end of said central shaft for driving said central shaft in rotation;
  first coupling means on said central shaft between said first and second central shaft bearings for driving a flexible drive means;
  second coupling means on said offset shaft between said first and second offset shaft bearings for being driven on rotation by a flexible drive means;
  a flexible drive means extending around said first and second coupling means;
  means for driving said central shaft in rotation by a second drive motor.

2. The knife drive of claim 1 wherein said first and second coupling means are chain sprockets and said flexible drive means is a drive chain.

3. The knife drive of claim 1 wherein said means for driving said central shaft in rotation by a second drive motor comprises a drive pulley and flexible belt.

* * * * *